US010103432B2

(12) United States Patent
Harel

(10) Patent No.: US 10,103,432 B2
(45) Date of Patent: Oct. 16, 2018

(54) MULTIBAND ANTENNA WITH VARIABLE ELECTRICAL TILT

(71) Applicant: Alcatel Lucent, Boulogne Billancourt (FR)

(72) Inventor: Jean-Pierre Harel, Lannion (FR)

(73) Assignee: Alcatel Lucent, Boulogne Billancourt (FR)

( * ) Notice: Subject to any disclaimer, the term of this patent is extended or adjusted under 35 U.S.C. 154(b) by 301 days.

(21) Appl. No.: 14/427,085

(22) PCT Filed: Sep. 9, 2013

(86) PCT No.: PCT/EP2013/068631
§ 371 (c)(1),
(2) Date: Mar. 10, 2015

(87) PCT Pub. No.: WO2014/040957
PCT Pub. Date: Mar. 20, 2014

(65) Prior Publication Data
US 2015/0244072 A1 Aug. 27, 2015

(30) Foreign Application Priority Data
Sep. 11, 2012 (EP) .................................... 12306096

(51) Int. Cl.
*H01Q 3/22* (2006.01)
*H04B 7/19* (2006.01)
(Continued)

(52) U.S. Cl.
CPC ............... *H01Q 3/36* (2013.01); *H01Q 1/246* (2013.01); *H01Q 3/40* (2013.01); *H01Q 5/28* (2015.01);
(Continued)

(58) Field of Classification Search
CPC ............ H01Q 3/36; H01Q 5/28; H01Q 1/246; H01Q 3/40; H01Q 21/0006; H01Q 25/00;
(Continued)

(56) References Cited

U.S. PATENT DOCUMENTS 3,731,316 A * 5/1973 Sheleg ..................... H01Q 3/40 342/373
3,736,592 A * 5/1973 Coleman ............. H01Q 3/2647 342/370
(Continued)

FOREIGN PATENT DOCUMENTS

CN 1553725 12/2004
CN 1748340 3/2006
(Continued)

OTHER PUBLICATIONS

Hossein Habibifar et al., "A Broadband Beamforming Method Based on Frequency Band Decomposition," 1st International Conference on Communications Engineering, pp. 92-97, XP002689687, Dec. 22-24, 2010.
(Continued)

*Primary Examiner* — Bernarr E Gregory
*Assistant Examiner* — Nuzhat Pervin
(74) *Attorney, Agent, or Firm* — Fay Sharpe LLP

(57) ABSTRACT

A feed system for controlling the variable electrical tilt in the vertical plane of arrayed radiating elements of a multiband antenna, comprising a Butler matrix with N inputs and N outputs comprising hybrid couplers, each input receiving a radio signal and each output transmitting the signal to at least one radiating element. At least one output of the Butler matrix is connected to a module comprising (i) a first stage of diplexers that separates the signal into different frequency bands, (ii) a second stage of fixed delay lines that applies a given electrical delay to the signal in each frequency band,
(Continued)

Figure 1:
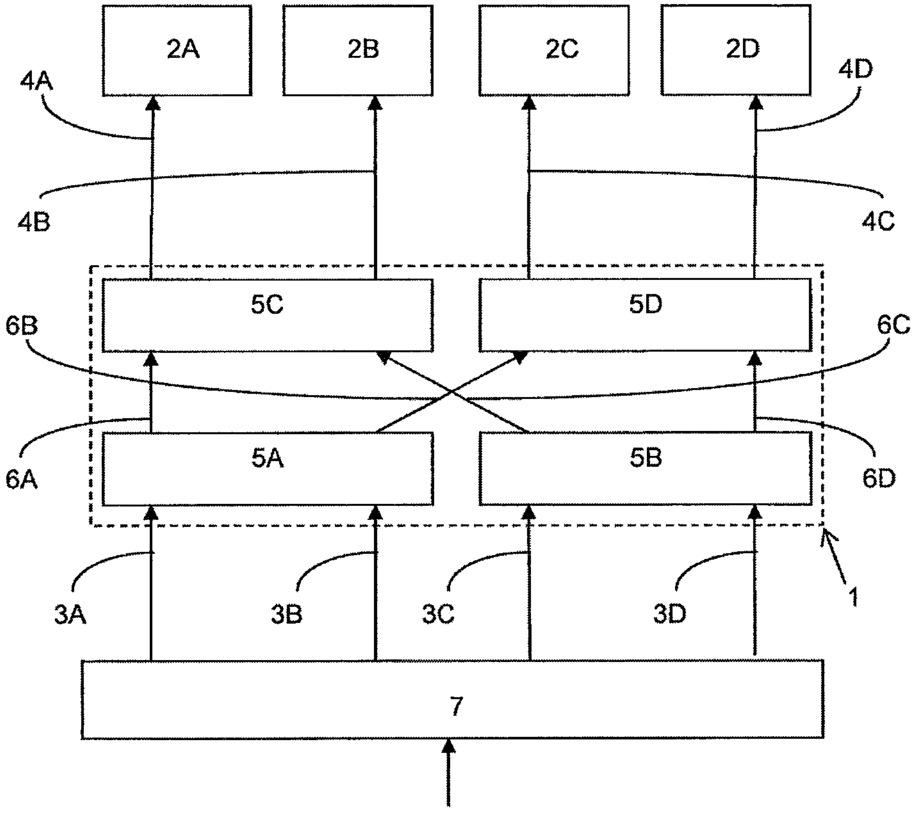

(iii) a third stage of variable phase shifters that introduce an adjusted phase shift of the signal into each frequency band, and (iv) a fourth stage of diplexers that combines the signals into the different frequency bands in order to transmit them to at least one radiating element.

8 Claims, 6 Drawing Sheets

(51) Int. Cl.
*H01Q 3/36* (2006.01)
*H01Q 1/24* (2006.01)
*H01Q 3/40* (2006.01)
*H01Q 25/00* (2006.01)
*H01Q 5/28* (2015.01)
*H01Q 21/00* (2006.01)

(52) U.S. Cl.
CPC ......... *H01Q 21/0006* (2013.01); *H01Q 25/00* (2013.01)

(58) Field of Classification Search
CPC .... H01Q 3/2647; H01Q 3/242; H01Q 3/2658; H01Q 3/267; H01Q 3/26; H01Q 3/22; H01Q 21/08; H01Q 21/0025; H01Q 3/30; H01Q 3/04; H01Q 21/30; H01Q 1/243; H01Q 3/34; H04B 7/18515; H04B 7/2041; H01P 5/103; G01S 7/021; H03F 1/56; H04L 5/08
USPC .......................................................... 342/372
See application file for complete search history.

(56) References Cited

U.S. PATENT DOCUMENTS 3,917,998 A * 11/1975 Welti ................. H04B 7/18515 327/557
4,316,192 A * 2/1982 Acoraci ................. H01Q 3/242 342/373
4,425,567 A * 1/1984 Tresselt ................. H01Q 25/02 342/373
4,451,831 A * 5/1984 Stangel .................. H01Q 3/242 342/374
4,689,627 A * 8/1987 Lee ......................... H01P 5/103 333/117
4,799,065 A * 1/1989 Thompson ........... H01Q 3/2658 342/372
4,831,619 A * 5/1989 Rosen .................... H01Q 25/00 370/325
4,839,894 A * 6/1989 Rudish ..................... H01Q 3/40 333/126
4,879,711 A * 11/1989 Rosen .................... H01Q 25/00 370/325
4,882,588 A * 11/1989 Renshaw ................. H01Q 3/22 342/354
5,086,302 A * 2/1992 Miller .................... H01Q 3/267 342/173
5,179,386 A * 1/1993 Rudish .................... G01S 7/021 342/371
5,233,358 A 8/1993 Murphy
5,257,031 A * 10/1993 Scarpetta ................. H01Q 3/26 342/374
6,104,935 A * 8/2000 Smith .................... H01Q 1/246 455/562.1
6,252,560 B1 * 6/2001 Tanaka ................... H01Q 21/08 342/371
6,463,301 B1 * 10/2002 Bevan ...................... H01Q 3/40 342/368
6,549,171 B1 * 4/2003 Mailloux ................. H01Q 3/40 342/373
6,791,507 B2 * 9/2004 Johansson ............. H01Q 1/246 343/754
6,864,837 B2 * 3/2005 Runyon ................. H01Q 1/246 342/372
8,489,041 B2 * 7/2013 Teillet .................... H01Q 1/246 455/114.3
8,674,895 B2 * 3/2014 Timofeev ............... H01Q 1/246 343/793
8,768,267 B2 * 7/2014 Lee ........................... H03F 1/56 330/126
9,325,065 B2 * 4/2016 Veihl ........................ H01Q 3/40
9,444,151 B2 * 9/2016 Kurk ...................... H01Q 21/30
9,484,619 B2 * 11/2016 Korva .................... H01Q 1/243
9,525,205 B2 * 12/2016 Oh ........................... H01Q 3/38
2005/0035825 A1 * 2/2005 Carson ............... H01Q 21/0025 333/117
2007/0281612 A1 * 12/2007 Benjamin .......... H04B 7/18515 455/13.3
2008/0062062 A1 * 3/2008 Borau .................... H01Q 1/246 343/844
2010/0311353 A1 * 12/2010 Teillet .................... H01Q 1/246 455/84
2013/0002505 A1 * 1/2013 Teillet .................... H01Q 1/246 343/835
2013/0235806 A1 * 9/2013 Nilsson .................. H01Q 1/246 370/328
2016/0111785 A1 * 4/2016 Park ......................... H01Q 3/30 343/858
2016/0134007 A1 * 5/2016 Ding ........................ H01Q 3/04 343/880
2016/0134412 A1 * 5/2016 Zimmerman ............. H04L 5/08 370/297

FOREIGN PATENT DOCUMENTS

EP 0 395 239 A1 10/1990
EP 0395239 A1 * 10/1990 ............... H01Q 3/22
EP 0395239 A1 * 10/1990 ............... H01Q 3/22
JP H02-302102 12/1990
JP H09-153722 6/1997
JP H09-232865 9/1997
JP H10-065435 3/1998
JP 2000 223924 A 8/2000
JP 2000223924 A * 8/2000 ............... H01Q 3/26
JP 2003-069334 3/2003

OTHER PUBLICATIONS

S. Ejaz et al., "Design and Analysis of Butler Matrix for Planar Array Applications," Proceedings of International Bhurban Conference on Applied Sciences & Technology, Islamabad, Pakistan, pp. 15-21, XP002689688, Jan. 10-13, 2011.
International Search Report for PCT/EP2013/068631 dated Jan. 24, 2014.

* cited by examiner

MULTIBAND ANTENNA WITH VARIABLE ELECTRICAL TILT

This invention relates to the field of telecommunication antennas transmitting radioelectric waves in the hyperfrequency range, using radiating elements. These are antenna systems adapted for use in numerous telecommunications systems, and particularly for an application in mobile radio communication cellular networks. It relates in particular to a base station panel antenna with a wide band and dual polarization, whose electrical tilt can be adjusted.

A coverage area is generally divided into a certain number of cells, each one associated with a base station and a respective antenna. Mobile radio communication cellular networks use array antennas that comprise an array of individual radiating elements such as dipoles. Here, the term "panel antenna" refers to an alignment of radiating elements operating within a given frequency range and comprising its own feed system. Panel antennas generally have one access connector for each frequency band and each polarization.

The change in the vertical angle of the main beam of the antenna, also known as "tilt", makes it possible to adjust the coverage area of the antenna. The antenna's angle of tilt can be adjusted electrically by changing the time delay or the phase of the signal sent or received by each radiating element of the array forming the antenna, which is called the adjustable or variable electrical tilt. In the common configuration, a single variable electrical tilt or VET control system commands the tilting of the antenna in the vertical plane for the entire available frequency band for each polarization. If the available frequency spectrum must be divided into multiple narrow frequency bands, it becomes necessary to introduce diplexers. However, if the diplexer is placed at the entrance to the VET electrical tilt control system, the antenna's electrical tilt cannot be adjusted independently for each narrow frequency band.

One solution concerning the possibility of controlling the variable electrical tilt (VET) for each frequency band is to connect one diplexer to each radiating element, and to use a variable electrical tilt (VET) feed system for each band to be controlled. The term "diplexer" refers to a passive device that performs multiplexing to combine/separate the signals into different frequency bands depending on the direction in which it is installed. In the present case, the diplexer behaves as two filters operating in different frequency bands with one of their entrances shared. Such a diplexer allows the radiating element to which it is connected to operate at the same time in both of the frequency bands associated with the two feed systems connected to the diplexer, both when transmitting and receiving. There are several technologies for constructing these diplexers whose weight, volume, performance, and cost vary.

If the number of radiating elements is high, it will not be possible to use so-called "high-performance" diplexers (using air cavity resonators, for example) due to the volume, weight, and cost that this type of device can represent. Consequently, small-size diplexers are chosen, such as diplexers using microstrip lines formed on substrates with a high dielectric constant (such as ceramic) or that use surface acoustic wave (SAW) techniques. The performance of these small-size diplexers is less than that of diplexers using, for instance, air cavity resonators. Insertion loss (IL), return loss (RL), and isolation between the frequency bands will significantly impact the overall RF performance of the antenna. Furthermore, it is necessary to have a complete feed array dedicated to each band, and for each polarization, to be controlled. Depending on the technology used to perform these functions, this may be prohibitive due to the volume, weight, and cost that the needs of a single diplexer and a feed array for each frequency band may represent.

The purpose of the present invention is to eliminate the drawbacks of the prior art, and in particular to propose a simple, single feed system making it possible to feed the entirety of a wideband antenna and to individually control the variable electrical tilt (VET) in the vertical plane of that antenna for each narrow frequency band.

The subject matter of the present invention is a feed system for controlling the variable electrical tilt in the vertical plane of arrayed radiating elements of a multiband antenna, comprising a Butler matrix with N inputs and N outputs comprising hybrid couplers, each input being capable of receiving a radio signal and each output being capable of transmitting the signal to at least one radiating element. At least one Butler matrix output is connected to a module allowing an independent electrical tilt for each frequency band, the module comprising

- a first stage of diplexers that separates the signal into different frequency bands,
- a second stage of fixed-delay lines that applies a given electrical delay to the signal within each frequency band,
- a third stage of variable phase shifters that introduce an adjusted phase shift of the signal to each frequency band, and
- a fourth stage of diplexers that combines the signals within the different frequency bands in order to transmit them to at least one radiating element.

According to a first aspect, the module is connected to a pair of radiating elements by means of a power splitter and at least one fixed-delay line. Preferentially, the output of the module is connected to the input of a power splitter, one of the outputs of the power splitter being connected to a first radiating element and the other output of the power splitter being connected to a fixed-delay line connected to a second radiating element.

According to a second aspect, the system comprises a number of modules less than the number N of outputs of the Butler matrix. Preferentially, the number of modules is equal to N−1.

According to a first variant, the Butler matrix comprises N hybrid couplers, of which N/2 hybrid couplers belong to a first group and N/2 hybrid couplers belong to a second group. Preferentially, the Butler matrix comprises N inputs connected to the N/2 hybrid couplers of the first group, each hybrid coupler of the first group comprising two outputs and each output being respectively connected to a different hybrid coupler of a second group.

According to a second variant, the Butler matrix comprises N+N/2 hybrid couplers, of which N/2 hybrid couplers belong to a first group and N/2 hybrid couplers belong to a second group, and N/2 hybrid couplers belong to a third group. Preferentially, the Butler matrix comprises N inputs connected to N/2 hybrid couplers of the first group, each hybrid coupler of the first group comprising two outputs, a first output being directly connected to a hybrid coupler of a second group and the second output being connected to a hybrid coupler of the second group by means of a hybrid coupler of the third group.

The invention pertains to the art of coupling circuits for phasing signals. More particularly, this invention relates to controlling the phase of phased multielement antennas. Each radiating element of the phased multielement antenna processes a signal that is phase-shifted relative to the signals processed by the other radiating elements within the antenna. The reason for this is that a combined radiation field developed by a phased multielement antenna at a single distant point is the vector sum of the radiation fields produced by the individual radiating elements in the phased antenna. By correctly controlling the respective phases of the signals processed by the phased multielement antenna, it is possible to focus a combined radiation field very strongly in a desired direction, and in a desired radiation pattern shape.

The advantage of this system is that it makes it possible to share a wideband antenna between multiple users (i.e. an antenna comprising multiple inputs) and/or between multiple narrower frequency bands.

It is important to understand that the feed system makes it possible to control the tilt of the pattern of a multiband antenna regardless of which input of the feed system is chosen for use. Each of those inputs may receive a single-band or multiband signal, whether the connection is an uplink or a downlink. This system enables an independent electrical tilt for each narrow frequency band with a single feed network. The variable electrical tilt (VET) in the vertical plane of the antenna's radiation pattern is controlled independently for each frequency band. Only one feed system is necessary, regardless of the number of frequency bands. For example, in the event that multiple users are sharing a multiband antenna, one of them needs to use multiple sub-bands. Any one of the entrances may be assigned to that user, as the feed system is capable of operating on multiple frequency sub-bands via one of those entrances, and of independently controlling them appropriately.

The antenna's entrances are not specific to a predetermined frequency band, meaning that an incoming signal in a given frequency band may be connected to any one of the input connectors. The same is true for an outgoing signal. The number of entrances is independent of the number of frequency bands that may be controlled by variable electrical tilt (VET). The system is bifunctional in that it operates both in one direction and in the reverse direction without modification.

A further subject matter of the invention is a method for controlling the variable electrical tilt in the vertical plane of arrayed radiating elements of a multiband antenna by means of a feed system according to one of the preceding claims, characterized in that the electrical tilt is adjusted independently for each frequency band by means of a module, connecting the Butler matrix to the radiating elements, which comprises a variable phase-shifter on the path of the signal in each frequency band.

It is important to note that the order and arrangement of the various elements composing it affects the functionalities of the feed system. They cannot be modified without leading to changes in how the feed system operates.

Figure 2:
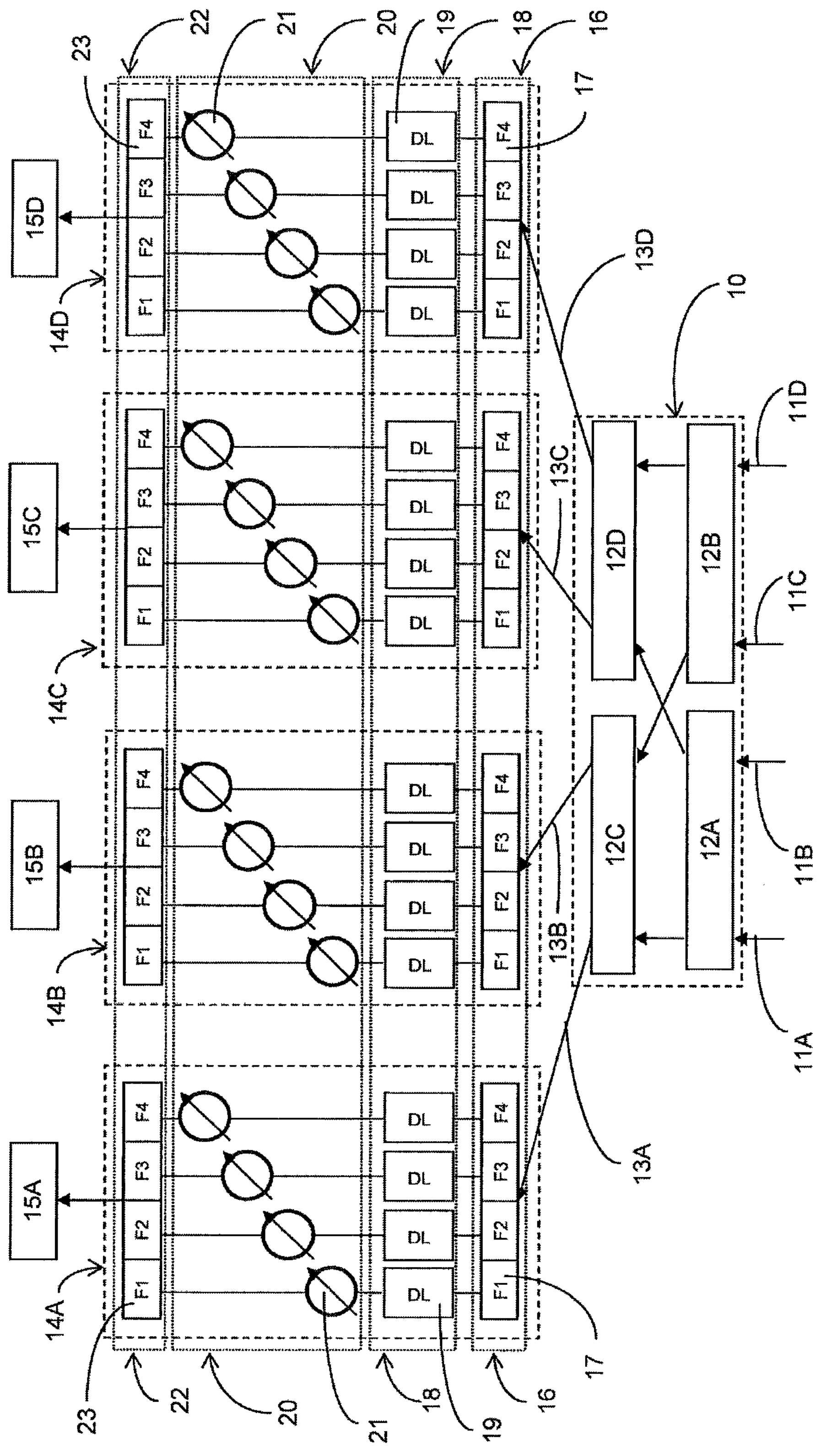
Figure 3:
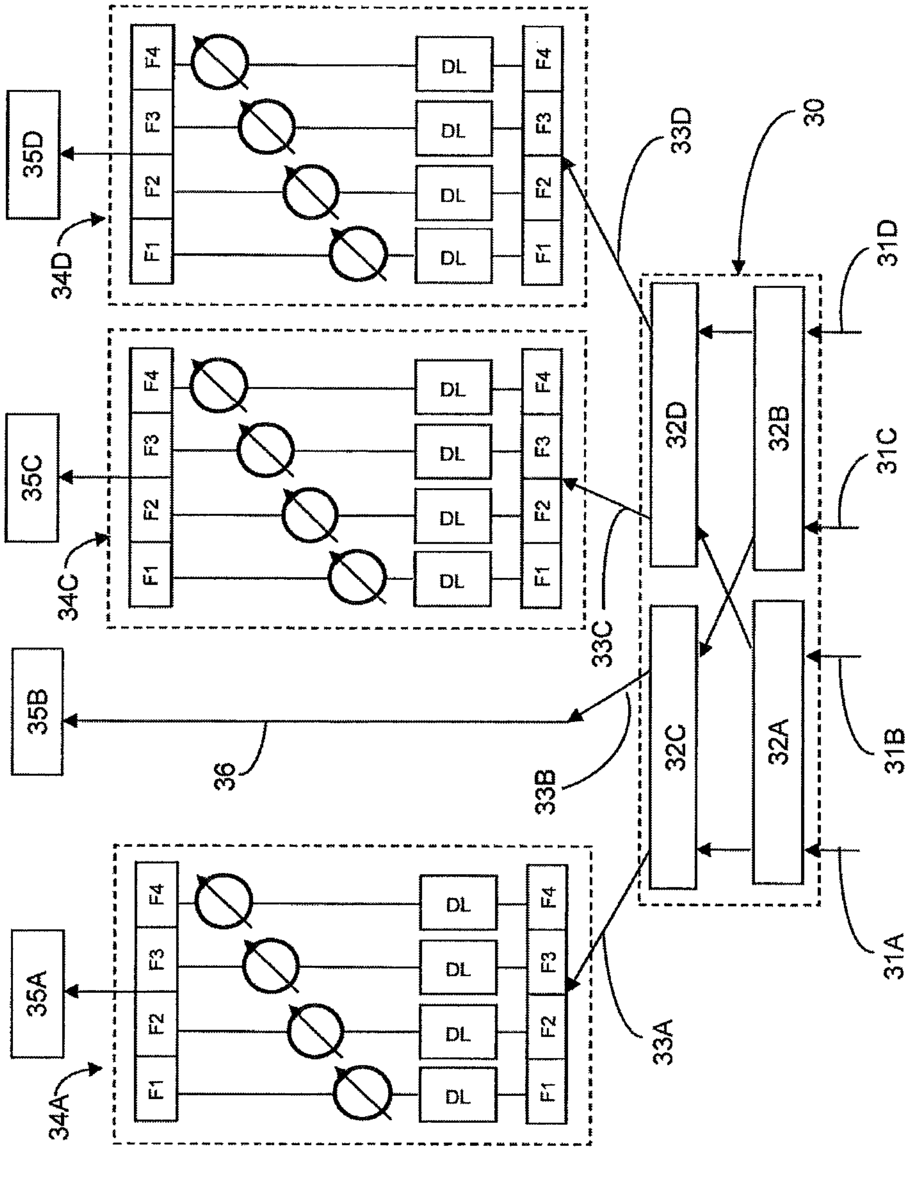
Figure 4:
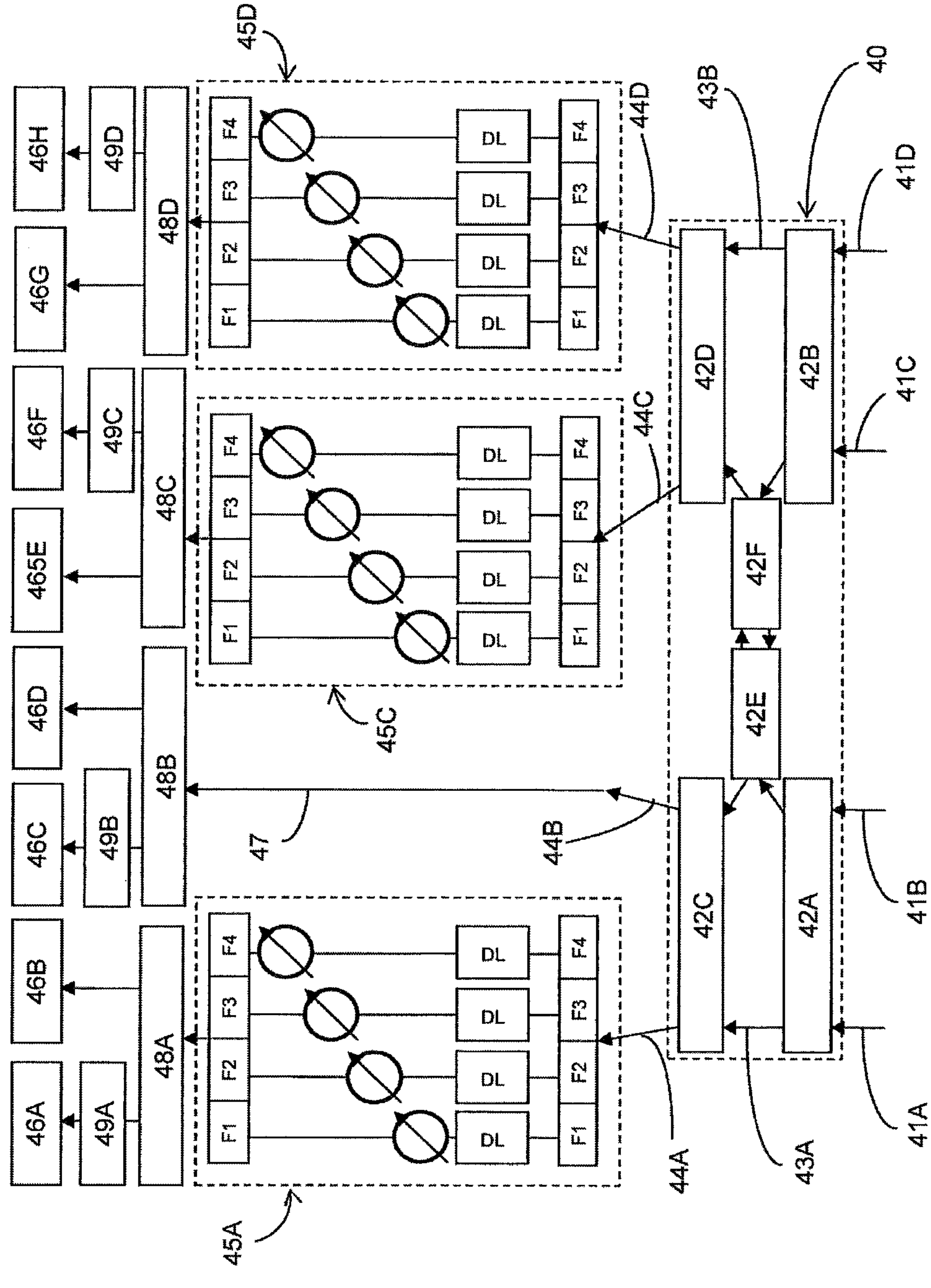
Figure 5:
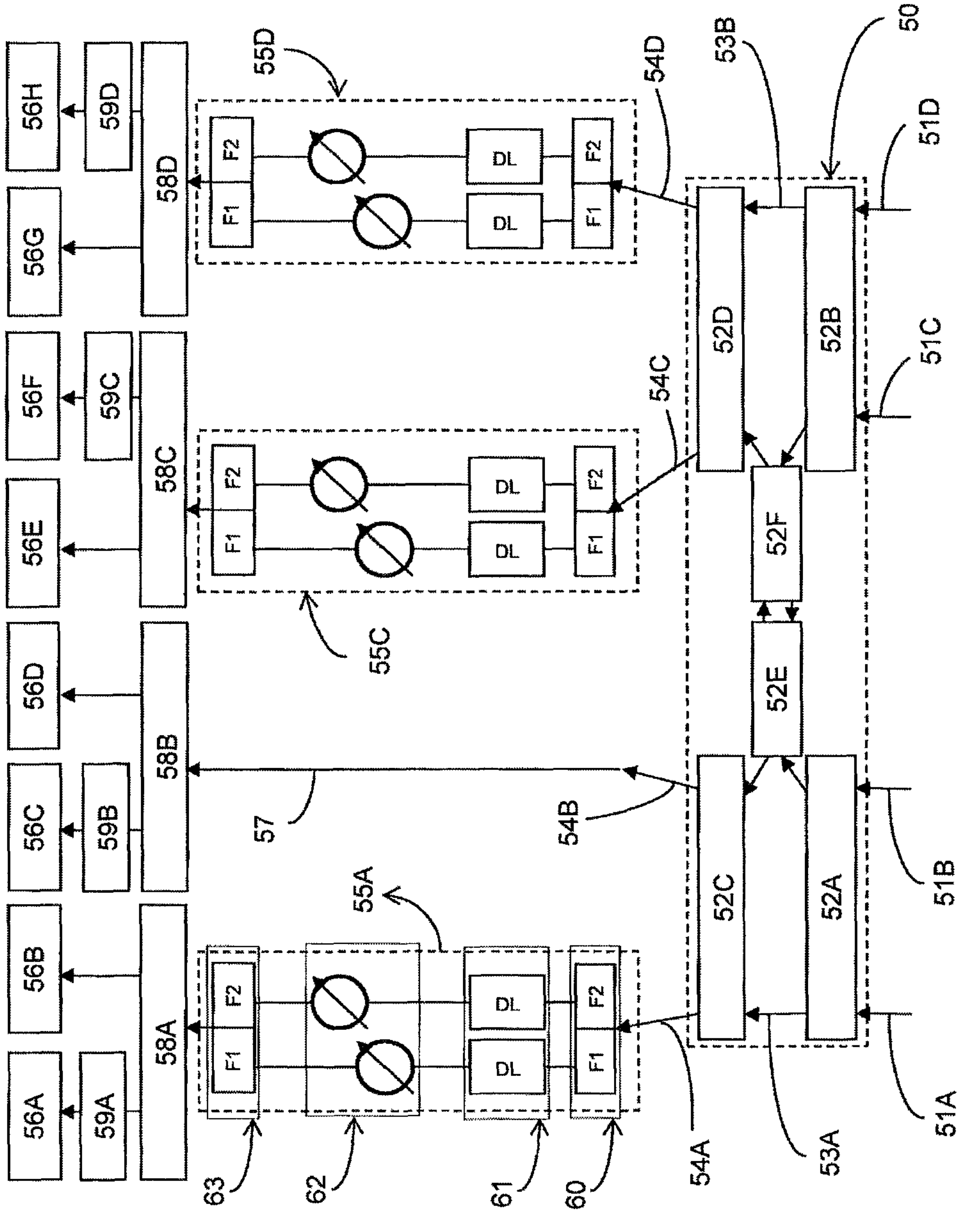
Figure 6:
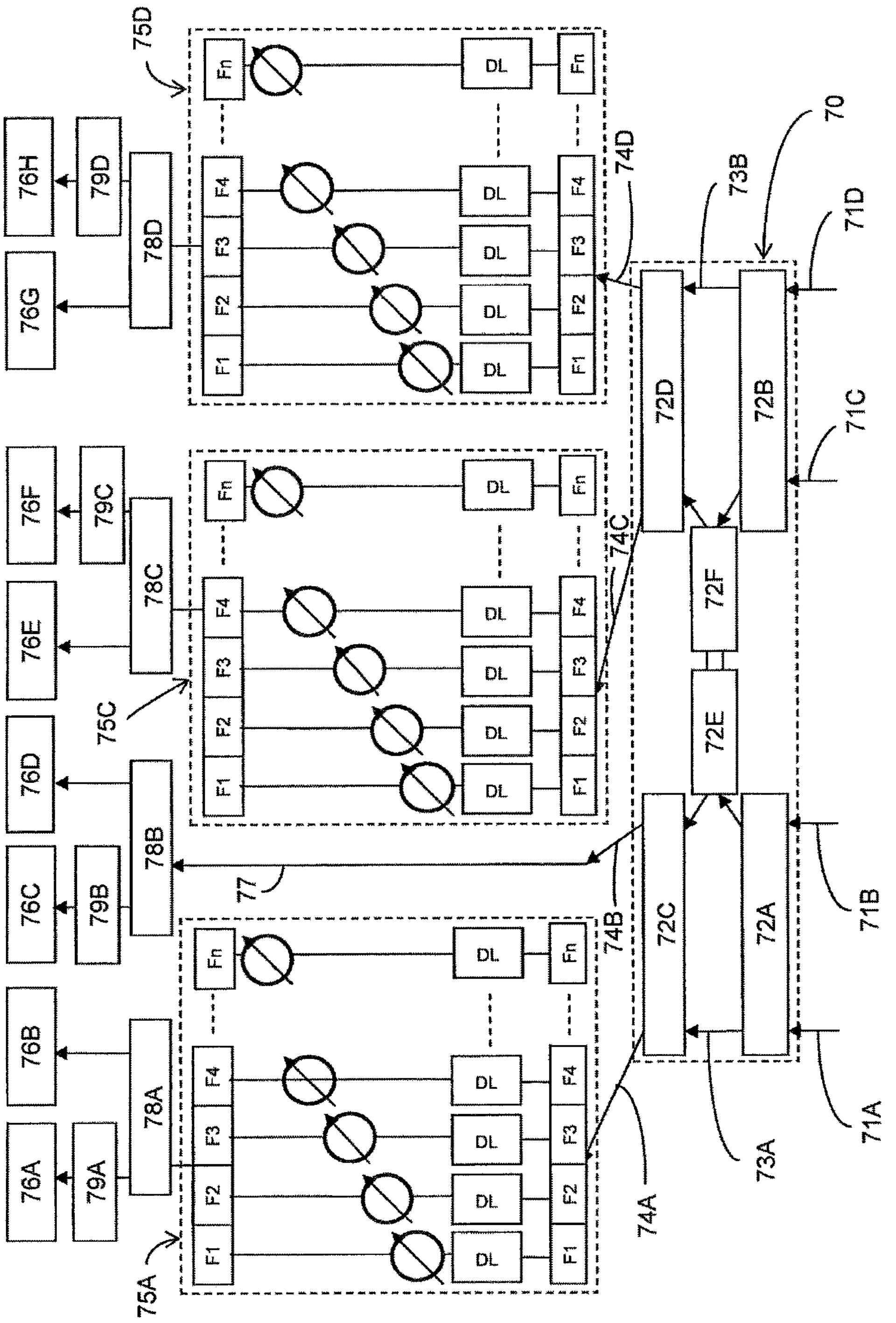

Other characteristics and advantages of the present invention will become apparent upon reading the following description of one embodiment, which is naturally given by way of a non-limiting example, and in the attached drawing, in which:

FIG. 1 depicts the principle of a 4×4 Butler matrix without delay lines,

FIG. 2 depicts a first embodiment of a feed system for four antenna radiating elements wherein the tilts in four frequency bands are independently controlled, FIG. 3 depicts a second embodiment of an antenna feed system that is a simplified variant of the embodiment of FIG. 3, FIG. 4 depicts a third embodiment of a feed system for eight antenna radiating elements wherein the tilts in four frequency bands are independently controlled, FIG. 5 depicts a fourth embodiment of a feed system for eight antenna radiating elements wherein the tilts in two frequency bands are independently controlled, FIG. 6 depicts a fifth embodiment of a feed system for eight antenna radiating elements wherein the tilts in n frequency bands are independently controlled.

FIG. 1 is an illustration of a Butler matrix. In 1961, Jesse Butler and Ralf Lowe proposed a disruptive topology for a feed system of an antenna that would allow the direct generating of multiple beams for antennas with arrayed radiating elements. Originally intended for surveillance radar and altimetry, this feed principle is now widely used in many applications.

This antenna feed configuration mainly uses known hybrid couplers and delay lines. A Butler matrix makes it possible to produce M beams using M (or M−1) input connectors. This is a hyper frequency reciprocal passive device that is an arrangement of hybrid couplers with N inputs and N outputs, wherein N is generally a power of 2. More generally, a Butler matrix with $2^N$ inputs is formed of $N2^{N-1}$ hybrid couplers and □(N−1)□$2^{N-1}$ phase-chapters, for a total of (2N−1)□$2^{N-1}$ components. The number of intersections required by the specific apology of Butler matrices is $2^{N-1}(2^N-N-1)$.

Take the example of a known 2×2 Butler matrix. When the first input is used, a 0° phase signal is sent to the first radiating element while a −90° phase signal is sent to the second radiating element. This 90° phase shift between the two signals is due to −3 dB hybrid couplers that split the input signals into two signals that have half the initial energy and an output phase that is shifted by 90° relative to the other. Consequently, by using the first input, the array pattern has a particular angle tilt θ, and by using the second input the array pattern has a particular angle tilt −θ.

FIG. 1 depicts an example of a Butler matrix 1 said to be 4×4, which does not comprise any delay lines. The Butler matrix 1 is intended to feed four antenna radiating elements 2A-2D, and comprises four inputs 3A-3D and four outputs 4A-4B. Each of the four outputs 4A-4B is connected to each radiating element 2A-2D respectively. The Butler matrix further comprises four −3 dB hybrid couplers 5A-5D, the hybrid couplers 5A and 5B of a first group being respectively connected to the hybrid couplers 5C and 5D of a second group by links 6A and 6B, as well as by links 6C and 6D. A first-stage switch 7 is commonly used before the inputs 4A-4B to make it possible to select which input to feed.

When the input 3A is used, the presence of the hybrid coupler 5A on the path of the signal splits the input signal into two signals, each one having half the energy, with an output phase shifted by 90° for one signal relative to the other. The hybrid coupler 5A produces both a 0° phase signal sent to the hybrid coupler 5C by the link 6A, and a 90° phase signal sent to the hybrid coupler 5D by the link 6B. The hybrid coupler 5C in turn introduces an electrical delay that causes a phase shift of the 0° phase signal added by the link 6A. The radiating element 2B receives at its input 4B a signal that is phase-shifted by 90° relative to the input signal and relative to the signal received by the radiating element 2A at its input 4A.

Likewise, when the input 3C is used, the hybrid coupler 5B thereby produces both a 0° phase signal sent to the hybrid coupler 5C by the link 6C, and a 90° phase signal sent to the hybrid coupler 5D by the link 6D. The hybrid coupler 5D in turn introduces an electrical delay that causes an additional 90° phase shift of the phase signal added by the link 6D. The radiating element 2C receives at its input 4C a signal phase-shifted by 90° relative to the input signal and the radiating element 2D receives at its input 4D a signal phase-shifted by 180° relative to the input signal.

At each of the four outputs 4A-4D of the Butler matrix 1, an outgoing signal is recovered with one-quarter the energy of the incoming signal. The phase shifts observed at the output 4A-4B of the Butler matrix 1 based on the chosen input 3A-3D are given in the table below.

TABLE

| | 4A | 4B | 4C | 4D |
|---|---|---|---|---|
| 3A | 0° | 90° | 90° | 180° |
| 3B | 90° | 180° | 0° | 90° |
| 3C | 90° | 0° | 180° | 90° |
| 3D | 180° | 0° | 90° | 0° |

This shows that if one wants all of the arrayed radiating elements to be fed with the same phase, it is necessary to introduce offsetting electrical delays at the inputs of radiating elements 2A, 2B, 2C and 2D. For example, for the use of input 3A, electrical delays of 180°, 90°, 90°, and 0° must be introduced at the inputs of radiating elements 2A, 2B, 2C and 2D respectively to offset the phase shift observed at the output of the Butler matrix 1 (see the first line of the table). The resulting phase observed at the input of each radiating element 2A-2D will then be the same, and will be shifted 180° relative to the input signal: 0°+180°=180° (element 2A); 90°+90°=180° (element 2B); 90°+90°=180° (element 2C); 180°+0°=180° (element 2D).

However, it should be noted that the same combination of delays does not make it possible to obtain an in-phase feed of all radiating elements if one of the other three inputs 3B-3D is used, the combination of delays to apply is specific to each input 3A-3D. For example, when using the input 3B, it would be necessary to add offsetting electrical delays of 90°, 0°, 180°, and 90° at the inputs of the radiating elements 2A, 2B, 2C, and 2D respectively. The resulting phase observed at the input of each radiating element 2A-2D will then be the same, and will be shifted 180° relative to the input signal: 90°+90°=180° (element 2A); 180°+0°=180° (element 2B); 0°+180°=180° (element 2C); 90°+90°=180° (element 2D).

In the first embodiment depicted in FIG. 2, a 4×4 Butler matrix 10 comprising no delay lines, analogous to the 4×4 Butler matrix 1 of FIG. 1, comprises four inputs 11A-11D connected to four hybrid couplers 12A-12D. At each radio entrance 11A-11D, an input signal is injected, which may be a single-band signal or a multi-band signal comprising, for example, multiple frequency bands F1-F4.

The 4×4 Butler matrix 10 therefore also comprises four outputs 13A-13D. To each of the outputs 13A-13D of the Butler matrix 10, a module 14A-14D is connected that respectively links the outputs 13A-13D to the radiating elements 15A-15D. It should be noted that the modules 14A-14D are all identical. An appropriate electrical delay and phase shift are introduced by the modules 14A-14D. The entrances 11A-11D of the antenna are not specific to a predetermined frequency band. Regardless of the input 11A-11D used, a signal can be directed towards one of the radiating elements 15A-15D.

The multiband signal entering the module 14A-14D is separated into narrow frequency bands F1, F2, F3, or F4 by a first stage 16 of diplexers 17.

A second stage 18 comprising a fixed delay line DL 19 for each frequency band channel F1-F4 in order to apply an appropriate electrical delay to the signal in each frequency band F1-F4 respectively. It may be desired, for example, that all of the signals in the frequency band F1 reaching the radiating elements 15A-15D be in phase when exiting the fixed delay lines 19. In this case, the fixed delay line 19 associated with the frequency band channel F1 connected with the radiating elements 15A will likely introduce a different delay value from the one introduced by the fixed delay line 19 associated with the frequency band F1 connected to the radiating element 15B. This is due to the fact that the signals in the frequency band F1 did not all take the same path in the Butler matrix 10.

The signal then passes into a stage 20 of variable phase-shifters 21 that introduces a phase shift adapted to each frequency band F1-F4. The variable phase-shifters 21 make it possible to vary the electrical tilt of the antenna independently for each of the frequency band F1-F4. In the absence of variable phase-shifters 21, the antenna would have a fixed tilt in the frequency band F1 for instance, meaning that the radiation pattern of the antenna in the frequency band F1 would be directed at a given fixed angle relative to the horizon. This fixed tilt results from the delay introduced by the fixed delay line 19.

Finally, the signals of the different frequency bands F1-F4 reach a stage 22 of diplexers 23. These diplexers 23 make it possible to combine signals belonging to different frequency bands F1-F4 resulting from the stage 20 of variable phase-shifters 21, and their simultaneous transmission by a shared channel to the radiating element 15A-15D.

The outgoing signals from the modules 14A-14D respectively feed the radiating elements 15A-15D that are all capable of operating in all frequency bands F1-F4. Consequently, the variable electrical tilt (VET) in the vertical plane of the radiation pattern of the antenna may be controlled independently for each frequency band F1, F2, F3 and F4 using the modules 14A-14D comprising variable phase-shifters 21.

It is important to note that the position of the Butler matrix 10 at the input of the feed system makes it possible to create an isolation between the inputs 11A, 11B, 11C and 11D taken two at a time.

FIG. 3 depicts a second embodiment analogous to that of FIG. 2, but in which one of the radiating elements is not associated with a module.

A 4×4 Butler matrix 30 comprising no delay lines, analogous to the 4×4 Butler matrix 10 of FIG. 2, comprises four inputs 31A-31D connected to four hybrid couplers 32A-32D. In each entrance 31A-31D a multiband signal can be introduced comprising, for example, multiple bands F1-F4. The 4×4 Butler matrix 30 therefore also comprises four outputs 33A-33D. To three of the outputs 33A, 33C, and 33D of the Butler matrix 30, a module 34A, 34C, and 34D is assigned that respectively connects the outputs 33A, 33C, and 33D to the radiating elements 35A, 35C, and 35D. It should be noted that the modules 34A-34D are all identical. The output 33B is directly linked by a coaxial cable 36 to the radiating element 35B.

The radiation pattern of the antenna in the vertical plane is obtained by far-field summation of the different fields radiated by each of the radiating elements. However, this summation is performed using one of the radiating elements, chosen arbitrarily, as a reference. It is therefore sufficient to control the difference in phase between the radiating element 35B, for instance, chosen arbitrarily as a reference, and the other radiating elements 35A, 35C, and 35D. Controlling the absolute phase of each radiating element is therefore no longer necessary. Compared to the embodiment of FIG. 2, one of the modules, associated with the chosen radiating element 35B, was remove, and controlling the difference in phase between the elements 35A-35D can be performed by the modules 34A, 34C, and 34D, which are retained.

The embodiments depicted by FIGS. 2 and 3 have numerous advantages over the prior art.

(i) Only one feed network is needed for all frequency bands (like the bands F1-F4 in the embodiments in FIGS. 2 and 3), regardless of the number of bands available. In the prior art, a complete dedicated feed network was necessary for each of the frequency bands.

(ii) In each radio entrance (like the inputs 11A-11D or 31A-31D in the embodiments of FIGS. 2 and 3 respectively), a multiband signal can be injected that comprises multiple frequency bands (like the bands F1-F4 in the embodiments of FIGS. 2 and 3) given that the radio entrances are isolated from one another. Modules that perform filtering and phase-shifting functions (like the modules 14A-14D or 34A, 34C and 31D in the embodiments of FIGS. 2 and 3 respectively), manage the frequency breakdown of the multiband into multiple narrower frequency bands, and adapt the phase shift for each frequency band. In this case, the positioning of the variable electrical tilt (VET) is managed by the frequency band F1-F4, rather than by the input 11A-11D or 31A-31D.

(iii) A signal belonging to any frequency band can be injected into each radio entrance, meaning that it is possible, for instance, to send a signal in frequency band F1 to the input 11A, a signal in frequency band F2 to the input 11B, a signal in frequency band F3 to the input 11C, a signal in frequency band F4 to the input 11D, but also a signal in frequency band F4 to the input 11A, a signal in frequency bands F1 and F3 to the input 11B, a signal in frequency bands F2 and F4 to the input 11C, a signal in frequency band F1 to the input 11D, or any other permutation or combination. A radio entrance therefore is not dedicated to a specific frequency band. The phase shift values introduced by the modules (like the modules 14A-14D or 34A, 34C and 31D in the embodiments of FIGS. 2 and 3 respectively) must only be set to suitable values based on the chosen configuration.

A third embodiment is depicted in FIG. 4. A 4×4 Butler matrix 40, comprising no delay lines, comprises four inputs 41A-41D connected to two hybrid couplers 42A and 42B of a first group. In each entrance 41A-41D a multiband signal can be introduced comprising, for example, multiple bands F1-F4. The couplers 42A and 42B of the first group are respectively connected to the couplers 42C and 42D of a second group by direct links 43A and 43B, while the couplers 42A and 42B of the first group are connected to the couplers 42C and 42D of the second group by means of hybrid couplers 42E and 42F of a third group. In this advanced embodiment, the intersection lines of the Butler matrix have been replaced by hybrid couplers 42E and 42F, which makes it possible to create a complete Butler matrix that comprises no intersecting links. The 4×4 Butler matrix 30 therefore also comprises four outputs 44A-44D. At each of the four outputs 44A-44D of the Butler matrix 30, an outgoing signal is recovered with one-quarter the energy of the incoming signal.

Each of the outputs 44A, 44C and 44D is respectively connected to a module 45A, 45C and 45D. An appropriate electrical delay and phase shift are introduced by the modules 45A, 45C, and 45D. The two radiating elements 46A and 46B are connected to the module 45A by means of a power splitter 48A and a delay line 49A placed before one of the two radiating elements 46A and 46B, for example here the radiating element 46A. The output 44B is connected by a coaxial cable 47 to the two radiating elements 46C and 46D by means of a power splitter 48B and a delay line 49B placed before one of the two radiating elements 46C and 46D, for example the radiating element 46C. Likewise, the module 45C is connected to the two radiating elements 46E and 46F by means of a power splitter 48C and a delay line 49C placed before one of the two radiating elements 46E and 46F, for example the radiating element 46F. Meanwhile, the two radiating elements 46G and 46H are connected to the module 45D by means of a power splitter 48D and a delay line 49D placed before one of the two radiating elements 46G and 46H, for example here the radiating element 46H. The outputs have been duplicated, owing to the combination of splitters and delay lines, in order to make it possible to go from four to eight radiating elements fed without increasing the number of inputs.

In the embodiment depicted in FIG. 4, the radiating elements are therefore phase-controlled in pairs. Other configurations based on the same principle are achievable, such as by limiting the duplicating of the output to only some modules, or conversely by tripling or even quadrupling the output of some modules by adding more splitters combined with the delay lines.

Naturally, the controlling of eight radiating elements would also be possible through the use of an 8×8 Butler matrix, for example one followed by eight or seven modules as described respectively in the embodiments of FIGS. 2 and 3. However, FIG. 4 depicts an advantageous embodiment from a cost, weight, and volume of the antenna perspective.

Limiting the number of components needed, and therefore simplifying the antenna's architecture, is only possible if a partial decrease in radio performance is accepted, which is reflected in the antenna's radiation pattern.

FIG. 5 depicts one particular embodiment in which the tilt of the antenna is controlled only for two frequency bands F1 and F2.

A 4×4 Butler matrix 50, comprising no delay lines, comprises four inputs 51A-51D connected to two hybrid couplers 52A and 52B of a first group. In each entrance 51A-51D a multiband signal can be introduced comprising two frequency bands F1 and F2. The hybrid couplers 52A and 52B are respectively connected to the hybrid couplers 52C and 52D of a second group by direct links 53A and 53B, while the couplers 52A and 52B are connected to the couplers 52C and 52D by means of hybrid couplers 52E and 52F of a third group. At each of the four outputs 54A-54D of the Butler matrix 50, an outgoing signal is recovered with one quarter the energy of the incoming signal.

Each of the outputs 54A, 54C and 54D of the Butler matrix 50 is respectively connected to a module 55A, 55C and 55D. The two radiating elements 56A and 56B are connected to the module 55A by means of a power splitter 58A and a delay line 59A placed before one of the two radiating elements 56A and 56B, for example the radiating element 56A. The output 54B is connected by a coaxial cable 57 to the two radiating elements 56C and 56D by means of a power splitter 58B and a delay line 59B placed before one of the two radiating elements 56C and 56D, for example the radiating element 56C. Likewise, the module 55C is connected to the two radiating elements 56E and 56F by means of a power splitter 58C and a delay line 59C placed before one of the two radiating elements 56E and 56F, for example here the radiating element 56F. Meanwhile, the two radiating elements 56G and 56H are connected to the module 55D by means of a power splitter 58D and a delay line 59D placed before one of the two radiating elements 56G and 56H, for example the radiating element 56H.

An appropriate electrical delay and phase shift are introduced by the modules 55A, 55C, and 55D. The dual-band signal entering the module 55A is separated into two narrow frequency bands F1 and F2 by a first stage 60 of diplexers. A second stage 61 comprising fixed-delay lines applies a determined electrical delay to the signal within each frequency band F1 and F2 respectively. The signal then passes into a third stage 62 of variable phase-shifters that adapts the phase shift in each frequency band F1 and F2 in order to vary the electrical tilt independently for each of the frequency bands F1 and F2. Finally, the signal reaches the fourth stage 63 of diplexers that combines the signals belonging to the two frequency bands F1 and F2 to send them to the power splitter 58A. The signal exiting the power splitter 58A feeds the radiating element 56A and, via the fixed delay line 59A, the radiating element 56B, which are able to operate in both frequency bands F1 and F2. The variable electrical tilt (VET) in the vertical plane of the radiation pattern of the antenna may thereby be controlled independently for each frequency band F1 and F2 owing to the module 55A. Likewise, the explanations given for the module 55A apply to the modules 55C and 55D.

The embodiment depicted in FIG. 6 makes it possible to control 1 to n frequency bands F1-Fn where n is greater than 4.

A 4×4 Butler matrix 70 comprising no delay lines, analogous to the 4×4 Butler matrix 50 of FIG. 5, comprises four inputs 71A-71D connected to hybrid couplers 72A and 72B of a first group. The hybrid couplers 72A and 72B are respectively connected to the hybrid couplers 72C and 72D of a second group by direct links 73A and 73B, while the couplers 72A and 72B are connected to the couplers 72C and 72D by means of hybrid couplers 72E and 72F of a third group. Each of the outputs 74A, 74C and 74D of the Butler matrix 70 is respectively linked to a module 75A, 75C and 75D, similarly to the modules 55A, 55C and 55D of FIG. 5. The modules 75A, 75C and 75D are themselves each linked to a pair of radiating elements 76A-76B, 76E-76F and 76G-76H respectively by means of power splitters 78A, 78C and 78D and delay lines 79A, 79C and 79D. The output 74B is linked by a coaxial cable 77 to the pair of radiating elements 76C-76D by means of a power splitter 78B and a delay line 79B.

At each radio entrance 71A-71D, an input signal is injected, which may be a single-band signal or a multi-band signal comprising, for example, multiple frequency bands F1-Fn. The variable electrical tilt (VET) in the vertical plane of the antenna's radiation pattern is controlled independently for each frequency band F1-Fn. The number of frequency bands F1-Fn is not necessarily limited, except by constraints that are imposed. The multiband signal entering the modules 74A, 74C and 74D is separated into narrow frequency bands F1-Fn owing to a first stage of diplexers.

It is important to note that the position of the Butler matrix 70 at the input of the feed system makes it possible to create an isolation between the radio entrances 71A, 71B, 71C and 71D taken two at a time.

Naturally, the invention is not limited to the embodiments described. In particular, it will be possible to extend the described examples to all types of Butler matrices with 2 to N inputs and outputs, to control 1 to n frequency bands F1-Fn and feed 1 to X radiating elements from each of the outputs.

The invention claimed is:

1. A feed system for controlling the variable electrical tilt in the vertical plane of arrayed radiating elements of a multiband antenna, comprising a Butler matrix and at least one module including delay lines, the Butler matrix having N inputs and N outputs and hybrid couplers, each input being capable of receiving a radio signal monoband or multiband belong to any frequency band and each output being capable of transmitting the signal to at least one radiating element allowing an independent electrical tilt for each frequency band, at least one output of the Butler matrix is connected to the module, which links the at least one output to the respective radiating element, the module comprising:

a first stage of diplexers that receives the signal from said output and separates the signal into different frequency bands, a second stage of fixed-delay lines that applies a given electrical delay to the signals from the first stage within each frequency band, a third stage of variable phase shifters that introduces an adjusted phase shift of the signals from the second stage in each frequency band, and a fourth stage of diplexers that combines the signals from the third stage in the different frequency bands to transmit them to at least one radiating element.

2. The feed system according to claim 1, wherein the module is connected to a pair of radiating elements via a power splitter and at least one fixed-delay line.

3. The feed system according to claim 2, wherein the output of the module is connected to the input of a power splitter, one of the outputs of the power splitter being connected to a first radiating element and the other output of the power splitter being connected to a fixed-delay line connected to a second radiating element.

4. The feed system according to claim 1, comprising a number of modules less than the number N of outputs of the Butler matrix.

5. The feed system according to claim 4, wherein the number of modules is equal to N 1.

6. The feed system according to claim 1, wherein the Butler matrix comprises N hybrid couplers, of which N/2 hybrid couplers belong to a first group and N/2 hybrid couplers belong to a second group, each hybrid coupler of the first group comprising two outputs and each output being respectively linked to a different hybrid coupler of a second group.

7. The feed system according to claim 1, wherein the Butler matrix comprises N+N/2 hybrid couplers, of which N/2 hybrid couplers belong to a first group, N/2 hybrid couplers belong to a second group, and N/2 hybrid couplers belong to a third group, each hybrid coupler of the first group comprising two outputs, a first output being directly linked to a hybrid coupler of the second group and the second output being linked to a hybrid coupler of the second group by means of a hybrid coupler of the third group.

8. A method for controlling the variable electrical tilt in the vertical plane of arrayed radiating elements of a multiband antenna via a feed system, wherein the feed system comprises a Butler matrix and at least one module including delay lines, the Butler matrix having N inputs and N outputs and hybrid couplers, each input being capable of receiving a radio signal monoband or multiband belong to any frequency band and each output being capable of transmitting the signal to at least one radiating element allowing an independent electrical tilt for each frequency band, at least one output of the Butler matrix is connected to the module, which links the at least one output to the respective radiating element, the method comprising:

receiving the signal from said output and separating the signal into different frequency bands, applying a given electrical delay to the signals within each frequency band, introducing an adjusted phase shift of the signals in each frequency band, and combining the signals from the third stage in the different frequency bands to transmit them to at least one radiating element.

* * * * *